US006378244B1

(12) United States Patent
Iwata et al.

(10) Patent No.: US 6,378,244 B1
(45) Date of Patent: Apr. 30, 2002

(54) **METHOD OF CULTIVATING FRUIT BODIES OF *AGARICUS BLAZEI* IN ARTIFICIAL MUSHROOM CULTIVATION BED**

(75) Inventors: Makoto Iwata, Fukuoka-ken; Kenji Furuya, Nagano-ken, both of (JP)

(73) Assignee: IMB Kabushiki Gaisha, Fukuoka ken (JP)

(*) Notice: Subject to any disclaimer, the term of this patent is extended or adjusted under 35 U.S.C. 154(b) by 8 days.

(21) Appl. No.: 09/171,152

(22) PCT Filed: Feb. 12, 1998

(86) PCT No.: PCT/JP98/00563

§ 371 Date: Aug. 30, 1999

§ 102(e) Date: Aug. 30, 1999

(87) PCT Pub. No.: WO09/15440

PCT Pub. Date: Jun. 17, 1997

(30) Foreign Application Priority Data

Feb. 12, 1997 (JP) .............................................. 9-028194
Jun. 5, 1997 (JP) .............................................. 9-148267

(51) Int. Cl.$^7$ ................................................ A01G 1/04
(52) U.S. Cl. ........................................................ 47/1.1
(58) Field of Search ........................... 47/1.01 R, 58.1, 47/1.1

(56) References Cited

U.S. PATENT DOCUMENTS

| | | | | |
|---|---|---|---|---|
| 3,942,969 A | * | 3/1976 | Carroll, Jr. et al. | 71/5 |
| 4,803,800 A | * | 2/1989 | Romaine et al. | 47/1.1 |
| 5,000,976 A | * | 3/1991 | Odaira | 426/635 |
| 5,123,203 A | * | 6/1992 | Hiromoto | 47/1.1 |
| 5,505,647 A | * | 4/1996 | Dahlberg et al. | 47/1.1 |

FOREIGN PATENT DOCUMENTS

| | | |
|---|---|---|
| JP | 02195822 | 8/1990 |
| JP | 03123418 | 5/1991 |
| JP | 04004814 | 1/1992 |
| JP | 04252112 | 9/1992 |
| JP | 06086611 | 3/1994 |
| JP | 07115844 | 5/1995 |
| JP | 07274945 | 10/1995 |
| JP | 09154401 A | 6/1997 |

* cited by examiner

Primary Examiner—Michael J. Carone
Assistant Examiner—Aileen J. Baker
(74) Attorney, Agent, or Firm—Kinney & Lange, P.A.

(57) ABSTRACT

The present invention relates to a mushroom bed cultivation method for cultivating a fruit body of Agaricus and a grain-containing medium used for such a method. The method includes the step of culturing Agaricus in a medium including a grain. The medium further includes a nutrient, a medium matrix, and the like, as necessary.

19 Claims, 2 Drawing Sheets

METHOD OF CULTIVATING FRUIT BODIES OF *AGARICUS BLAZEI* IN ARTIFICIAL MUSHROOM CULTIVATION BED

TECHNICAL FIELD

The present invention relates to a mushroom bed cultivation method for cultivating a fruit body of Agaricus and a medium used for such a method.

BACKGROUND ART

Various types of mushrooms belonging to genus Agaricus of the family Agaricaceae (hereinafter, comprehensively referred to "Agaricus") are known, including Agaricus blazei Murrill, *Agaricus bisporus, Agaricus sylvaticus, Agaricus arvensis* and the like. For example, Agaricus blazei Murrill is also referred to as "himematsutake" or "kawariharatake" (Takashi MIZUNO and Masamitsu KAWAI, ed., "Kinoko no Kagaku/Seikagaku, published by Gakkai Shuppan Center, pp. 223–228 (1992)). Agaricus blazei Murrill grows naturally in the mountains of Piedade in the suburbs of Sao Paulo, which is located in the southeast part of Brazil, and the inhabitants there have been eating its fruit bodies for ages.

Recently, it was reported that an extract from fruit bodies of Agaricus is effective in curing adult diseases and cancer, and that Agaricus is a exceedingly promising medicinal mushroom. Thus, a demand for fruit bodies of Agaricus is expected to increase. So far, fruit bodies of Agaricus have been in demand more in Europe and the United States than in Japan, but is considered to be more and more demanded in Japan as a medicinal mushroom.

By the way, today, fruit bodies of Agaricus are merely obtained by picking natural Agaricus or cultivating in greenhouses such as vinyl plastic hothouses or prefabricated greenhouses, in warm regions by a "ridge culture method".

Even if natural Agaricus is picked, it has a disadvantage that natural Agaricus can only be obtained in warm regions as can be appreciated from the fact that Agaricus naturally grows in the southeast part of Brazil. The "ridge culture method" is the only method conventionally available for cultivating Agaricus. This method is carried out in the following manner. Ridges are formed of compost which is prepared by fermenting straw of rice, sugarcane bagasse or the like, and then the ridges are covered with soil to form ridge beds. Parts of the ridges where the compost exists are inoculated with a spawn of Agaricus, and then fruit bodies of Agaricus are grown. The ridge culture method is carried out in the greenhouses, but the yield of fruit bodies of Agaricus is low due to its roughness and is susceptible to influences of the weather since the greenhouses are built outdoors. Accordingly, stable production of fruit bodies of Agaricus throughout the year cannot be realized.

Therefore, a mushroom bed cultivation method in which the fruit bodies of Agaricus can be cultured stably, intensively, in large quantities and without any influence of the weather, is desired.

DISCLOSURE OF INVENTION

A mushroom bed cultivation method for cultivating a fruit body of Agaricus according to the present invention includes the step of culturing Agaricus in a medium including grain.

In a preferred embodiment, the grain includes at least one of foxtail millet, Deccan grass, Chinese millet, rice plant and wheat.

In a preferred embodiment, the medium includes foxtail millet, Deccan grass and Chinese millet.

In a preferred embodiment, the medium includes 35 to 45% of foxtail millet, 35 to 45% of Deccan grass, and 10 to 30% of Chinese millet in a dry weight ratio.

In a preferred embodiment, the medium further includes at least one of a nutrient and a medium matrix.

In a preferred embodiment, the medium includes the nutrient at a ratio of 0 to 300 weight parts and the medium matrix at a ratio of 0 to 300 weight parts with respect to 100 weight parts of the grain.

A medium for mushroom bed cultivation used for cultivating a fruit body of Agaricus according to the present invention includes a grain.

In a preferred embodiment, the grain includes at least one of foxtail millet, Deccan grass, Chinese millet, rice plant and wheat.

In a preferred embodiment, the medium includes foxtail millet, Deccan grass and Chinese millet.

In a preferred embodiment, the medium includes 35 to 45% of foxtail millet, 35 to 45% of Deccan grass, and 10 to 30% of Chinese millet in a dry weight ratio.

In a preferred embodiment, the medium further includes at least one of a nutrient and a medium matrix.

In a preferred embodiment, the medium includes the nutrient at a ratio of 0 to 300 weight parts and the medium matrix at a ratio of 0 to 300 weight parts with respect to 100 weight parts of the grain.

BEST MODE FOR CARRYING OUT THE INVENTION

Figure 1:
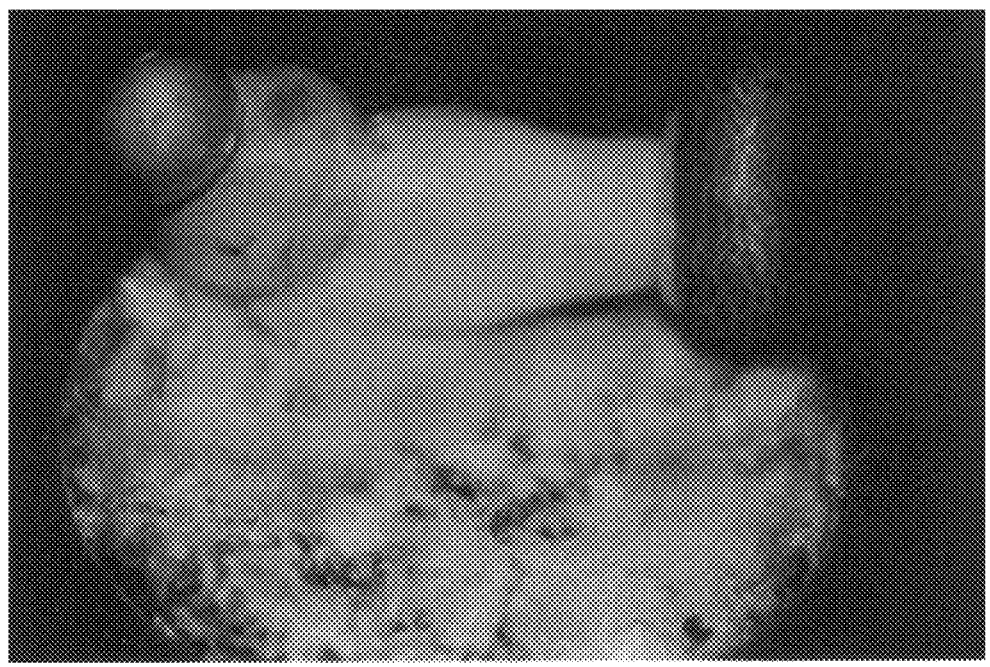
FIG. 1 is a photograph of fruit bodies of Agaricus obtained by a cultivation method described in Example 1 on day 7.

Hereinafter, a mushroom bed cultivation method and a medium used for such a method according to the present invention will be described in detail.

1. Medium for Mushroom Bed Cultivation for Cultivating Fruit Bodies of Agaricus A medium used in mushroom bed cultivation includes a grain.

In this specification, the term "grain" includes all the cultivated species of Poaceae such as, for example, foxtail millet, Deccan grass, Chinese millet, rice, sugarcane, wheat, barley and rye. Foxtail millet, Deccan grass and Chinese millet are particularly preferable grains, and the medium preferably includes these three types of grain. According to the present invention, a seed or a plant body of grain other than seed such as, for example, straw, wheat chaff, rice chaff, and sugarcane bagasse can be used. When a plant body other than the seed such as straw is used, the plant body is preferably used in the form of small pieces having a diameter of 15 mm or less and a length of 15 mm or less. The grain can be included in the medium in any form without any limitation. For example, the grain can be in granules such as, for example, crushed corncob, or seeds of foxtail millet and Deccan grass deprived of the seed coat; small pieces such as, for example, cut straw; or powders such as, for example, rice bran, corn bran, wheat bran, or crushed barley. One type of grain or a combination of arbitrary types of grain can be used in the present invention.

The medium can further include components other than grain such as, for example, a nutrient, a medium matrix, and an additive as necessary. Usable nutrients include any material used as nutrients in the art. For example, cow manure, poultry manure, bark, bean-curd refuse, bean pod, coffee grounds, sake (rice wine) lees, or byproduct of food production is usable.

Usable medium matrices include sawdust, wood chips, cotton seed coat bran, coconut peat, moss, and soil for horticulture. Usable additives include lime, oyster shell, molasses, and liquid fertilizer for plants.

The medium of the invention includes the nutrients in an amount of 0 to 300 weight parts, preferably of 10 to 100 weight parts, and more preferably of 20 to 50 weight parts with respect to 100 weight parts of the grain. The medium matrix is included in the medium in an amount of 0 to 300 weight parts, preferably of 50 to 200 weight parts, and more preferably of 100 to 150 weight parts with respect to 100 weight parts of the grain. The additive is included in the medium in an amount of 10 weight parts or less with respect to 100 weight parts of the grain.

The grain is included in the medium at a ratio, preferably of 30 weight % or more, more preferably of 35 weight % or more, and most preferably of 40 weight % or more, based on the total medium weight. The above-mentioned "weight" is "dry weight", which specifically refers to a weight measured after drying each component for 5 hours at a temperature of 90° C. In this specification, below, the term "weight" used regarding the medium composition refers to the dry weight.

As described above, the medium of the invention can include grain(s) only. A preferable example of such medium is a medium including 35 to 45 weight % of foxtail millet, 35 to 45 weight % of Deccan grass, and 10 to 30 weight % of Chinese millet. A preferable example of the medium also including components other than grain is a medium including, for example, 30 to 40 weight % of grain, 10 to 20 weight % of nutrient, and 40 to 50 weight % of medium matrix.

The above-described medium components are mixed and kneaded with water in a method well known to those skilled in the art. Thus, the medium used for mushroom bed cultivation method is prepared. Preferably, the mixture of the medium components is kneaded with water in about twice the weight amount of the mixture and then boiled until most of the water is evaporated. Then, the mixture is cooled.

The medium is accommodated in an appropriate type of culturing container as necessary. Any container which can withstand the sterilization process is usable regardless of the shape, size or material. For example, a bottle having a capacity of 850 ml and a diameter of 58 mm which is most commonly used in mushroom cultivation can be used, or other types of containers for mushroom bed cultivation, e.g., a bag for bag cultivation can be used.

2. Sterilization

The medium for mushroom bed cultivation obtained above is sterilized as it is or after being put into a culturing container. Any sterilization condition may be performed within general sterilization standards with no specific limitation. Exemplary sterilization methods include a high pressure vapor sterilization method and a normal pressure vapor sterilization method. For example, high pressure vapor sterilization performed at 121° C. for 60 minutes is preferable.

For performing vapor sterilization of a large quantity of medium, the sterilization is preferably performed for a longer time period.

3. Inoculation of Agaricus

A spawn of Agaricus is prepared by picking a hypha or a spore from natural or cultivated fruit bodies of Agaricus and proliferating the hypha or germinating the spore in the medium, or alternatively by proliferating a hypha of the strains which are stored in an institution for microorganism deposit or a research institute.

Inoculation is performed by mixing the obtained spawn and the sterilized medium for mushroom bed cultivation. The volumetric ratio of the spawn and the medium is preferably 1:100 to 1:25 although not specifically limited.

4. Cultivation of the Fruit Bodies 4.1 Culturing:

In order to cultivate fruit bodies of Agaricus, a spawn of Agaricus inoculated in the medium is first cultured to proliferate the hypha of the Agaricus, thereby completing hypha spreading. In this specification, "completion of hypha spreading" refers to the hypha being extended over the entirety of the medium. The spawn can be cultured under any conditions which allow Agaricus to grow, with no specific limitation. Preferably, the temperature is between 15° C. and 30° C., the humidity is between 50% and 75%, and the $CO_2$ concentration is 2500 ppm or less. More preferably, the temperature is between 20° C. and 28° C., the humidity is between 60% and 70%, and the $CO_2$ concentration is between 300 ppm and 2000 ppm. Still more preferably, the temperature is 25° C., the humidity is between 60% RH and 70% RH, and the $CO_2$ concentration is between 600 ppm and 1500 ppm. The medium inoculated with the spawn can be illuminated with light, but is preferably kept in the darkness. The time period required for completion of hypha spreading varies in accordance with the volume of the medium, i.e., the capacity of the container used for the culturing. Optionally, the hypha can be still cultured for another several days after the hypha spreading is completed to mature the hypha, thereby promoting formation of the fruit bodies. The maturing is completed in 5 to 20 days, preferably in 10 to 15 days, although the maturing is not necessary.

4.2 Induction of Formation of the Fruit Bodies:

After the spawn is cultured, the induction of formation of the bruit bodies is performed. Before the induction, the surface of the culture can be optionally covered with soil, for example, peat moss which is generally used in horticulture. The thickness of the soil is preferably between 1.0 cm to 3.5 cm although not specifically limited. If the surface is not covered with soil, the culture obtained in section 4.1, supra, is cultured under induction conditions as it is. If the surface is covered with soil, the culture obtained in section 4.1, supra, is covered with soil, and then cultured under induction condition.

Induction can be generally performed under any conditions which allow Agaricus to grow with no specific limitation. Preferably, the temperature is between 20° C. and 30° C., the humidity is between 80% and 98%, and the $CO_2$ concentration is 2500 ppm or less. More preferably, the temperature is between 22° C. and 28° C., the humidity is between 85% and 95%, and the $CO_2$ concentration is between 300 ppm and 2200 ppm. Still more preferably, the temperature is 25° C., the humidity is 95% RH, and the $CO_2$ concentration is between 600 ppm and 2000 ppm. The culture can be illuminated with light, but is preferably kept in the darkness. The humidity and the $CO_2$ concentration for induction are preferably higher than those for culturing. The number of days required for the induction is not specifically limited, but the induction is completed when formation of young fruit bodies is recognizable with human eye.

4.3 Growth of the Fruit Bodies:

The young fruit bodies obtained in section 4.2, can be grown under any conditions which allow Agaricus to grow with no specific limitation. Preferably, the temperature is between 20° C. and 30° C., the humidity is between 75% and 95%, and the $CO_2$ concentration is 2500 ppm or less. More preferably, the temperature is between 22° C. and 28° C., the humidity is between 80% and 90%, and the $CO_2$ concentration is between 300 ppm and 2000 ppm. Still more preferably, the temperature is 25° C., the humidity is 90% RH, and the $CO_2$ concentration is between 600 ppm and 1500 ppm. The fruit bodies need to be illuminated with light. The fruit bodies are preferably illuminated at 50 Lux to 500 Lux for 1 to 8 hours per day, more preferably at 100 Lux to 500 Lux for 2 to 6 hours per day, and still more preferably at 200 Lux to 500 Lux for about 3 to about 5 hours per day. The illuminance and the $CO_2$ concentration are appropriately controlled in order to obtain fruit bodies of a desirable form.

The number of days required for growth can vary in accordance with the growth conditions of Agaricus. The fruit bodies of Agaricus are harvested when grown to a desirable size.

EXAMPLES

Hereinafter, examples of the present invention will be described. However, the present invention is not limited by those examples.

Example 1

Cultivation of a Agaricus (Agaricus blazei Murrill) in a Bottle

1. Preparation of a Medium:

Seeds of Deccan grass, foxtail millet and Chinese millet were mixed at a dry weight ratio of 2:2:1, and then water of twice the weight amount of the resultant mixture was added and boiled. When most of the water was evaporated, boiling was stopped and the resultant mixture was cooled.

When the resultant medium was cooled to a temperature of 20° C. or lower, 600 g of the medium was put into each of a plurality of polypropylene bottles having an opening with a diameter of 58 mm and a capacity of 850 ml, and the bottles were capped. Next, high pressure vapor sterilization was performed at 1 atm (gauge pressure) at 121° C. for 60 minutes. Then, the bottles were cooled in a clean room until the temperature of the medium decreased to 18° C.

2. Inoculation of Agaricus:

Spores were harvested from fruit bodies of commercially available Agaricus (Agaricus blazei Murrill), and germination and propagation of hypha were performed on a potato dextrose agar medium (PDA medium) under the conditions of a temperature of 25° C., a humidity of 65% RH and in the darkness for 25 days. A PDA medium was newly inoculated with hypha pieces having a size of 5 mm×5 mm obtained by culturing and proliferating the hypha, and the hypha pieces were cultured under the same conditions. This process was repeated three times to purify the hypha. A mixture of the hypha pieces obtained in this manner and the medium having the same composition as that of the medium described in section 1, supra, was used as a spawn.

Inoculation was performed by mixing 15 g of the spawn and the sterilized medium obtained in section 1, supra. Such inoculation was performed in each of 16 bottles. (The volumetric ratio of the spawn and the medium was 1:40.)

3. Cultivation of the Fruit Bodies:

3.1 Culturing:

The spawn was cultured under the conditions of a temperature of 25° C., a humidity of 60 to 70% RH, a $CO_2$ concentration of 1500 ppm or less and in the darkness. Hypha spreading was completed in 20 days, but the hypha was still cultured for another 20 days to be matured. The total culturing period was 40 days.

3.2 Induction of Formation of the Fruit Bodies:

After completion of the culturing, induction was performed in two methods of (1) removing the caps of the bottles without scraping off the surface of the resultant mushroom bed, and (2) covering a surface of the resultant mushroom bed with peat moss to a thickness of 1 cm without scraping off the surface of the mushroom bed.

In either case, induction was performed under the conditions of a temperature of 25° C., a humidity of 95% RH, a $CO_2$ concentration of 2000 ppm or less and in the darkness.

The number of days required to form the fruit bodies was not substantially influenced by whether the surface of the mushroom bed was covered with peat moss or not. In either case, formation of young fruit bodies was observed in 14 to 17 days.

From these results, it was found that fruit bodies of Agaricus are formed whether or not the surface of the mushroom bed is covered with peat moss.

3.3 Growth of the Fruit Bodies:

The young fruit bodies obtained in section 3.2, were grown under the conditions of a temperature of 25° C., a humidity of 90% RH, and a $CO_2$ concentration of 1500 ppm or less. During this growth stage, the fruit bodies were illuminated at 200 to 500 Lux for 3 to 5 hours per day.

The fruit bodies grew to have a stipe length of 5 cm on day 7 as shown in FIG. 1. The yield of the fruit bodies per bottle was about 50 g on average.

The composition of the medium used in this example is in the form of particulates, and thus it was difficult to uniformly distribute the moisture in the medium. However, it was found that inoculation performed by mixing the medium and the spawn has an advantage of progressing the culturing more smoothly and thus forming the fruit bodies of Agaricus more stably.

Example 2

Cultivation of a Agaricus (Agaricus blazei Murrill) in a Bag

1. Preparation of a Medium:

Rice bran and wheat chaff as grain, cow manure as a nutrient, and sawdust as a medium matrix were mixed at a weight ratio shown in Table 1 below, and then kneaded with water. Different types of sawdust have different water contents. In this example, sawdust having a water contents of 63% was used. Heat-resistive polypropylene bags were each filled with 1500 g of the resultant mixture. Next, high pressure vapor sterilization was performed at a pressure of 1 atm (gauge pressure) at a temperature of 121° C. for 60 minutes. Then, the bags were cooled in a clean room until the temperature of the medium decreased to 18° C.

TABLE 1

Composition of the medium (per bag)

| Material | Weight | Water content |
| --- | --- | --- |
| Rice bran | 220 g | 12% |
| Wheat chaff | 150 g | 12% |
| Cow manure | 150 g | 56% |
| Sawdust | 480 g | 63% |
| Water | 500 g | 100% |
| Total | 1500 g | 61% |

2. Inoculation of Agaricus:

A spawn was obtained in the same manner as described in section 2 of Example 1. Inoculation was performed by mixing 80 g of the spawn and the sterilized medium contained in each of 20 bags obtained in section 1, Example 2, supra. (The volumetric ratio of the spawn and the medium was 1:25.) After the inoculation, the bags were closed.

3. Cultivation of the Fruit Bodies:

3.1 Culturing:

The spawn was cultured under the conditions of a temperature of 23 to 25° C., a humidity of 60 to 70% RH, a $CO_2$ concentration of 1500 ppm or less and in the darkness. Hypha spreading was completed in about 40 days, but the hypha was still cultured for another 10 days to be matured. The total culturing period was 50 days.

3.2 Induction of Formation of the Fruit Bodies:

After the culturing was over, induction was performed as follows. On about day 50 of culturing, top parts of the bags were cut off at about 5 cm from the upper surface of the resultant mushroom bed, and the surface was covered with peat moss or mountain soil for horticulture. The surface of the mushroom bed was not scraped off.

Induction was performed under the conditions of a temperature of 18 to 22° C. (3 to 5° C. lower than the temperature in section 3.1 in Example 2, supra), a humidity of 90 to 95% RH, a $CO_2$ concentration of 800 ppm or less and in the darkness. During the induction, water was sprayed to prevent the peat moss or the mountain soil covering the surface of the mushroom bed from becoming dried.

From around day 20 after the start of the induction formation of young fruit bodies was observed on the surface of the mushroom bed. This point was set as the start of "growth".

3.3 Growth of the Fruit Bodies:

The young fruit bodies obtained in section 3.2, were grown under the conditions of a temperature of 18 to 22° C., a humidity of 90 to 95% RH, and a $CO_2$ concentration of 800 ppm or less. During this growth stage, the fruit bodies were illuminated at 100 Lux for 2 to 3 hours per day.

Figure 2:
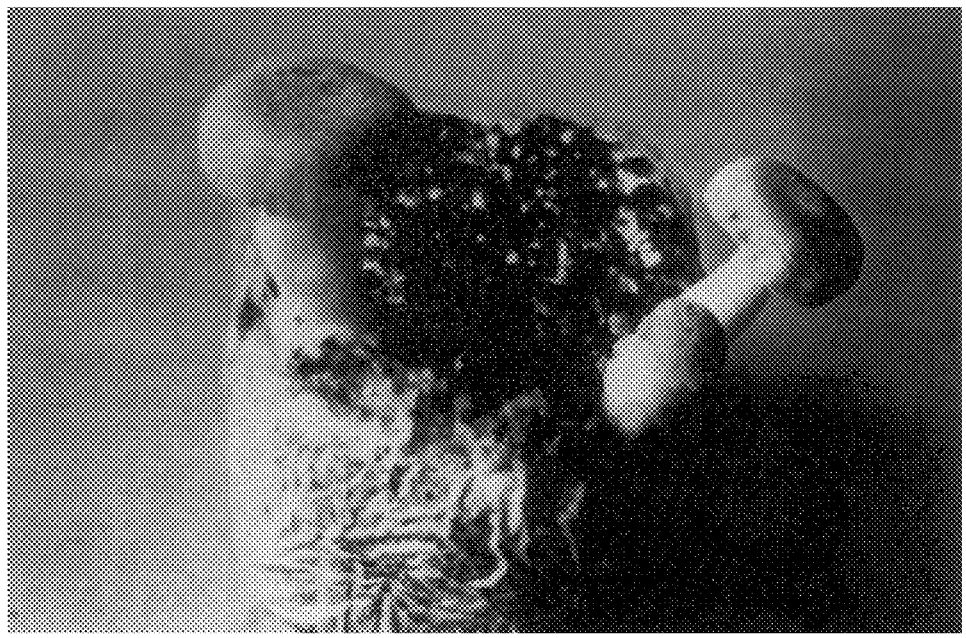
FIG. 2 is a photograph of fruit bodies of Agaricus obtained by a cultivation method described in Example 2 on day 7.

The fruit bodies grew to have a stipe length of about 8 to 12 cm on day 6 or 7 as shown in FIG. 2. The bodies were harvested before the pilei opened. The yield of the fruit bodies per bag was about 200 g on average.

It was found that the method according to these examples realize more stable cultivation of the fruit bodies of Agaricus.

Industrial Applicability

According to the present invention, cultivation of Agaricus in a mushroom bed which has been considered to be impossible is realized. The cultivation method according to the present invention, which realizes cultivation of fruit bodies of Agaricus in facilities regardless of the location, season or weather, opens the way for mass production. Cultivation within about 60 to 65 days (for total cultivation) is possible, which is not very different from the conventional mushroom cultivation.

According to the conventional "ridge culture method", cultivation is performed outdoors. Therefore, the danger of the ridge beds being contaminated by saprophyte and the danger of hypha of Agaricus being attacked by flies and pest insects in the soil are high and thus stable production of Agaricus is difficult.

In the cultivation method according to the present invention, .the medium for mushroom bed cultivation is inoculated with a spawn after the medium is sterilized and thus the saprophyte in the medium are killed, and the inoculated medium is cultured in a substantially sterile state. Therefore, the present cultivation method has an advantage that the problems of the conventional method can be overcome.

Moreover, in the cultivation method according to the present invention, the components included in the medium and the mixture ratios thereof can be relatively freely selected. Consequently, the present cultivation method has an advantage that the amount of medicinal component can be increased by adding to the medium a substance which is a starting material from which the medical component is formed through the biosynthetic pathway of the medicinal component of Agaricus.

The most promising antitumor active materials contained in Agaricus so far are polysaccharides including β-D-glucan. Nucleic acid, lectin, steroid, lipid and the like are also known to have an antitumor activity. Therefore, addition of glucose, sucrose, or starch to the medium is considered to be effective in increasing the antitumor active material (i.e., medicinal component) contained in Agaricus. The conventional method would not work well even if the starting material of the biosynthetic pathway of a medicinal component of Agaricus is added when the biosynthetic pathway is clearly found in the future. The reason is that the starting material is degraded by other microorganisms existing in the medium, resulting in reduction in the effect of the starting material or in promotion of proliferation of the other microorganisms to inhibit proliferation of the hypha of Agaricus of interest.

Furthermore, in the cultivation method according to the present invention, the culturing container used is not limited in the size or shape and a plurality of small culturing containers can be used. Thus, the method provides an advantage that the three-dimensional space in the cultivating facilities can be effectively used to improve cost effectiveness.

Additionally, the fruit bodies obtained by the cultivation method according to the present invention has the advantage it does not have a smell of mud and thus is more acceptable as a medicine taken after being decocted.

What is claimed is:

1. A mushroom bed cultivation method for cultivating a fruit body of Agaricus, the method comprising the step of culturing Agaricus in a medium including a grain, wherein the grain includes at least one of foxtail millet, Deccan grass, Chinese millet, rice plant and wheat, and wherein the grain is included in the medium at a ratio of 30 weight % or more.

2. A method according to claim 1, wherein the medium includes foxtail millet, Deccan grass and Chinese millet.

3. A method according to claim 2, wherein the medium includes 35 to 45% of foxtail millet, 35 to 45% of Deccan grass, and 10 to 30% of Chinese millet in a dry weight ratio.

4. A method according to claim 1, wherein the medium further includes at least one of a nutrient and a medium matrix.

5. A method according to claim 4, wherein the medium includes the nutrient at a ratio of 0 to 300 weight parts and the medium matrix at a ratio of 0 to 300 weight parts with respect to 100 weight parts of the grain.

6. A medium for mushroom bed cultivation used for cultivating a fruit body of Agaricus, the medium comprising a grain, wherein the grain includes at least one of foxtail millet, Deccan grass, Chinese millet, rice plant and wheat, and wherein the grain is included in the medium at a ratio of 30 weight % or more.

7. A medium according to claim 6, wherein the medium includes foxtail millet, Deccan grass and Chinese millet.

8. A medium according to claim 6, wherein the medium includes 35 to 45% of foxtail millet, 35 to 45% of Chinese millet in a dry weight ratio.

9. A medium according to claim 6, further comprising at least one of a nutrient and a medium matrix.

10. A medium according to claim 9, wherein the medium includes the nutrient at a ratio of 0 to 300 weight parts and the medium matrix at a ratio of 0 to 300 weight parts with respect to 100 weight parts of the grain.

11. A mushroom bed cultivation method for cultivating a fruit body of Agaricus, the method comprising the steps of culturing Agaricus in a medium including a grain and a manure after the medium was heated.

12. A medium for mushroom bed cultivation used for cultivating a fruit body of Agaricus, the medium comprising a grain and a manure, and the medium was heated.

13. A fruit body of Agaricus obtained by the method according to claim 1 or 11.

14. A fruit body of Agaricus having low content of heavy metals, wherein the heavy metals are arsenic, lead, cadmium and mercury.

15. A fruit body of Agaricus obtained by the method according to claim 11.

16. A method according to claim 1, wherein the Agaricus is Agaricus blazei.

17. A mushroom bed cultivation method for cultivating a fruit body of Agaricus, the method comprising:

culturing Agaricus in a medium including a grain, wherein the grain includes a seed or a product derived from a seed of at least one of foxtail millet, Deccan grass, Chinese millet, rice plant and wheat.

18. A medium for mushroom bed cultivation used for cultivating a fruit body of Agaricus, the medium comprising:

a grain, wherein the grain includes a seed or a product derived from a seed of at least one of foxtail millet, Deccan grass, Chinese millet, rice plant and wheat.

19. A mushroom bed cultivation method for cultivating a fruit body of Agaricus, the method comprising:

culturing Agaricus in a medium including a grain to form a mushroom bed, wherein the grain includes at least one of foxtail millet, Deccan grass, Chinese millet, rice plant and wheat, and wherein the fruit body of Agaricus is formed in the mushroom bed.

* * * * *